United States Patent [19]

Gefen

[11] Patent Number: 4,520,873
[45] Date of Patent: Jun. 4, 1985

[54] TRACTOR-DRIVEN AGRICULTURAL APPARATUS INCLUDING A PLURALITY OF ROTARY-DRIVEN AGRICULTURAL UNITS

[75] Inventor: Nir Gefen, Hagalil Hamaaravi, Israel
[73] Assignee: Eshet Eilon, Hagalil Hamaaravi, Israel
[21] Appl. No.: 503,292
[22] Filed: Jun. 10, 1983
[51] Int. Cl.³ .................... A01B 71/06; A01B 33/02
[52] U.S. Cl. ..................... 172/47; 172/117; 172/125; 172/443; 172/56; 172/123
[58] Field of Search .............. 172/47, 443, 451, 624, 172/310, 314, 117, 59, 56, 123, 49; 56/13.5, 13.6, 13.7

[56] References Cited

U.S. PATENT DOCUMENTS

| | | | |
|---|---|---|---|
| 1,605,795 | 11/1926 | Steele | 172/56 |
| 2,793,576 | 5/1957 | Carpi | 172/56 |
| 2,935,139 | 5/1960 | Dede | 172/47 X |
| 3,183,980 | 5/1965 | Howard | 172/47 |
| 3,303,890 | 2/1967 | Vissers | 172/56 |
| 4,301,643 | 11/1981 | Bailey | 56/13.6 |
| 4,373,590 | 2/1983 | Wittrock | 172/123 |
| 4,402,367 | 9/1983 | Causer | 172/446 |

FOREIGN PATENT DOCUMENTS

| | | | |
|---|---|---|---|
| 2652739 | 5/1978 | Fed. Rep. of Germany | 172/47 |
| 55853 | 5/1967 | German Democratic Rep. | 172/443 |
| 494136 | 3/1976 | U.S.S.R. | 172/443 |

Primary Examiner—Richard J. Johnson
Attorney, Agent, or Firm—Benjamin J. Barish

[57] ABSTRACT

Agricultural apparatus to be driven by a tractor comprises a main frame attachable to the rear end of the tractor, a pair of ground-engaging wheels carried on the opposite ends of the main frame, a pair of rotary-driven agricultural units mounted on opposite sides of the main frame along a common axis, and a third rotary-driven agricultural unit mounted on the main frame centrally between the pair of units and rearwardly of their common axis. The three rotary-driven agricultural units such as rotary tillers, are each independently mounted to the main frame by a separate 3-point connection, permitting each to be float upwardly or downwardly with respect to the ground.

10 Claims, 5 Drawing Figures 4,520,873

TRACTOR-DRIVEN AGRICULTURAL APPARATUS INCLUDING A PLURALITY OF ROTARY-DRIVEN AGRICULTURAL UNITS

BACKGROUND OF THE INVENTION

The present invention relates to agricultural apparatus for attachment to a tractor. The invention is particularly useful with respect to rotary tiller units, and is therefore described below with respect to this application.

Rotary tiller units are frequently attached to tractors for working the soil. Such a rotary tiller unit may be used alone or in combination with other agricultural ground-working units, as described for example in my copending patent application Ser. No. 342,930, now abandoned. The present invention provides apparatus enabling up to three of such rotary tiller units, or other rotary-driven agricultural units such as rotary choppers or rotary mowers, to be towed by a tractor at one time.

BRIEF SUMMARY OF THE INVENTION

According to a broad aspect of the present invention, there is provided agricultural apparatus comprising a main frame attachable to the rear end of the tractor to extend transversely across it, the main frame being supported by a pair of ground-engaging wheels on the opposite ends of the main frame. Two rotary-driven agricultural units, such as rotary tillers, are mounted on the opposite sides of the main frame along a common axis rearwardly of the main frame, and a third unit is mounted centrally between the two side units and rearwardly of their common axis. The three units are each independently mounted to the main frame by a separate 3-point connection permitting independent rising and lowering, floating movements of each unit with respect to the ground. The apparatus further includes a transmission coupling all three of the units to the power take-off shaft of the tractor.

Such an apparatus, particularly when used with rotary tillers, provides a high degree of flexibility in the manner the apparatus can be used according to one particular application. Thus, the apparatus enables a wide strip of the ground to be worked during each pass of the tractor, while permitting independent depth control of each of the units so that each unit may be operated at the appropriate depth for the portion of the wide strip which it works. In some cases it may be desired to de-couple the third unit and to use only the two side units, in which case the land would be worked according to an interlaced pattern; i.e., each pass would produce two worked strips separated by an unworked strip, with successive passes interlacing a strip worked in that pass with the strips worked in the previous pass. In other cases it may be desired to use only one unit, in which case only the center, rear unit would be used.

The apparatus of the present invention is thus very flexible in operation, in that it permits all three units to be used at one time, or only one or two units to be used at one time. Further flexibility is provided by permitting each of the units to be driven at a different speed from the common transmission, which thereby permits more efficient working according to the particular conditions involved.

While the invention is especially useful in rotary-tilling the soil, it could also be used with respect to other rotary-driven units, such as rotary mowers or choppers for mowing or chopping grass or other plants after harvesting.

Further features of the invention will be apparent from the description below.

BRIEF DESCRIPTION OF THE DRAWINGS

The invention is herein described, by way of example only, with reference to the accompanying drawings, wherein.

DETAILED DESCRIPTION OF PREFERRED EMBODIMENTS

Figure 1:
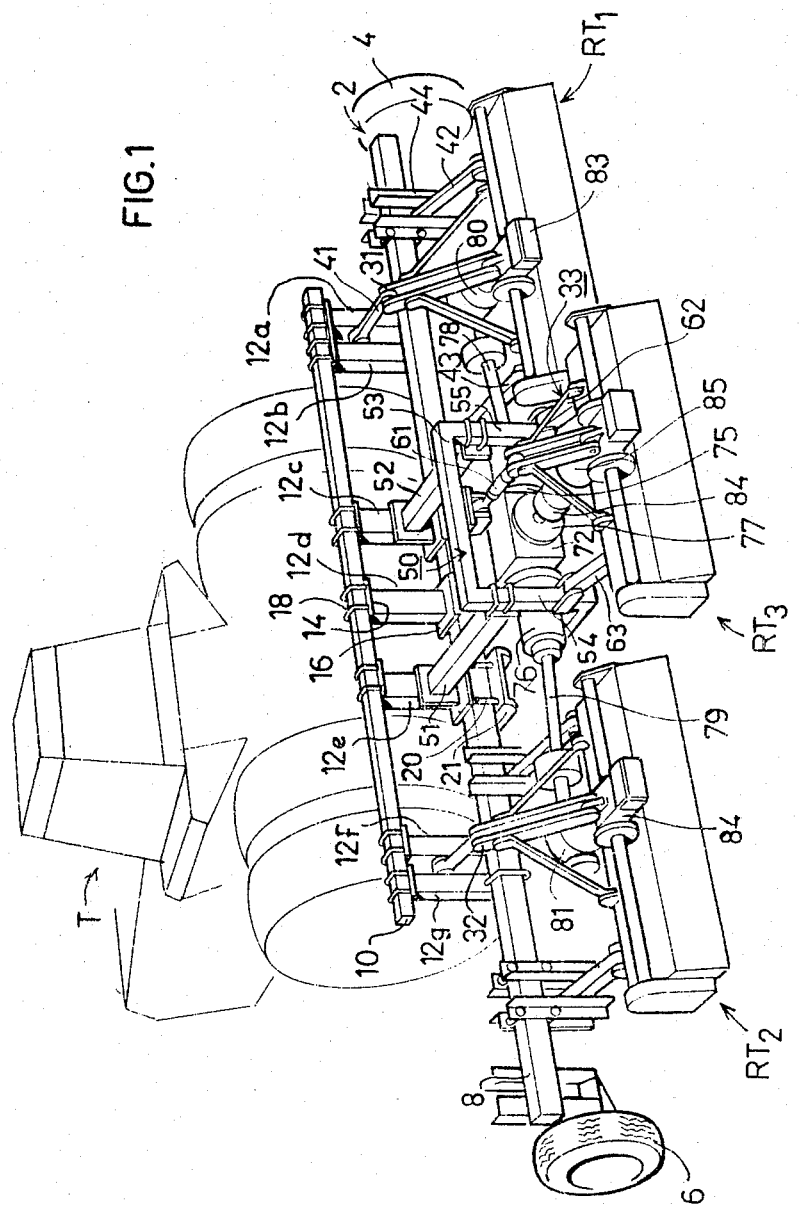
FIG. 1 is a 3-dimensional view illustrating one form of agricultural apparatus constructed in accordance with the present invention.
Figure 2:
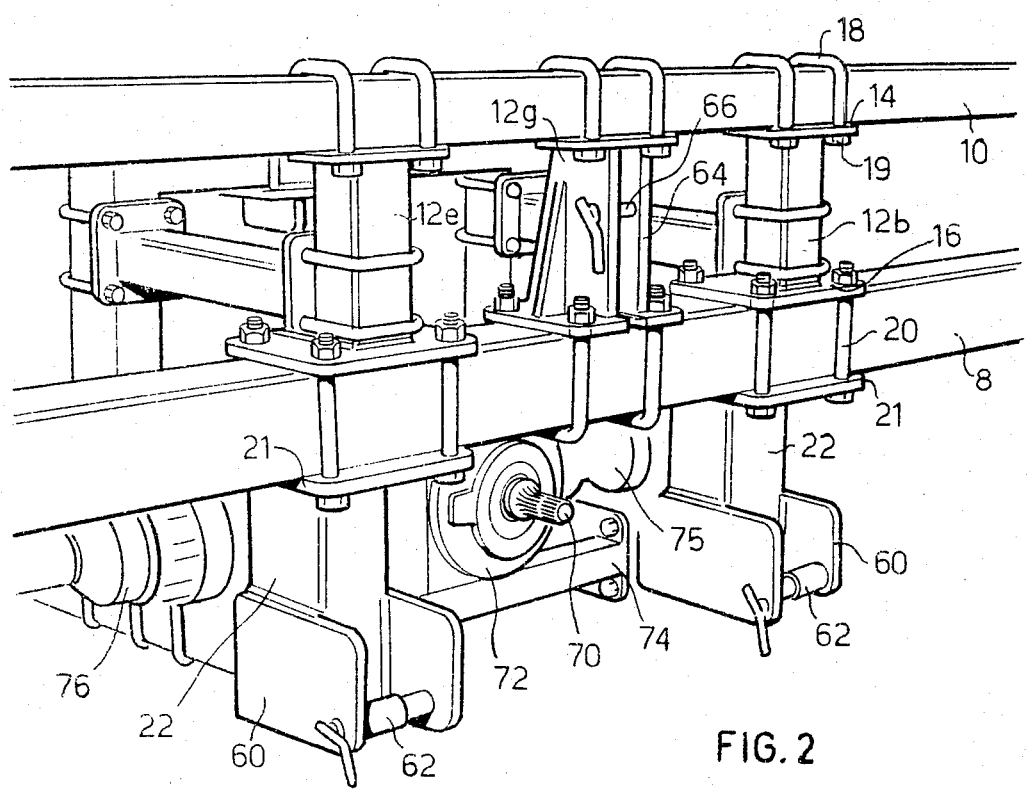
FIG. 2 is an enlarged fragmentary view, from the front of the main frame illustrated in FIG. 1, particularly showing the manner of its coupling to the tractor to be used for towing the apparatus.
Figure 3:
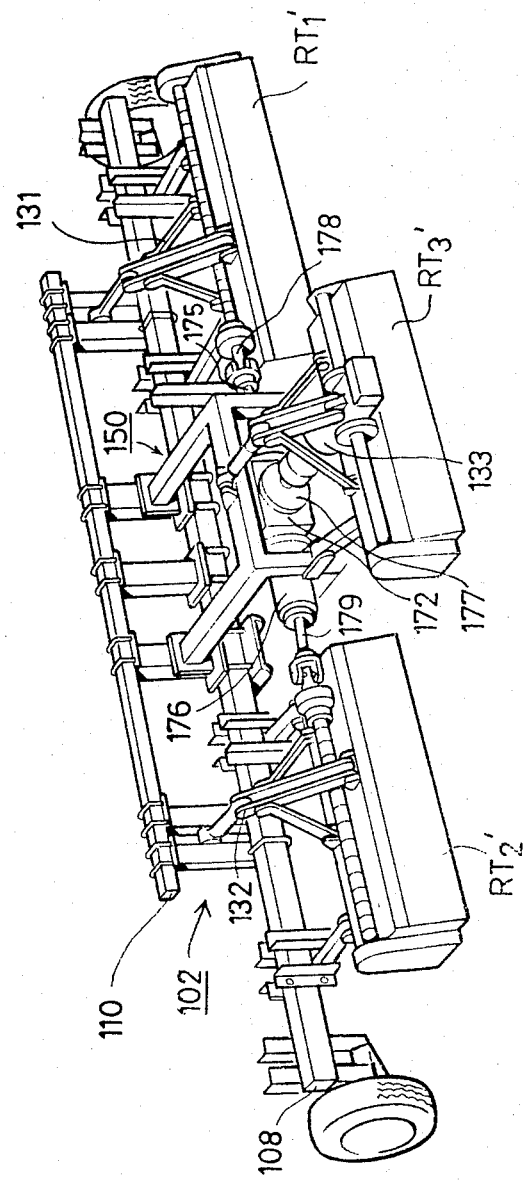
FIG. 3 is a 3-dimensional view illustrating a modification in the apparatus of FIG. 1.
Figure 4:
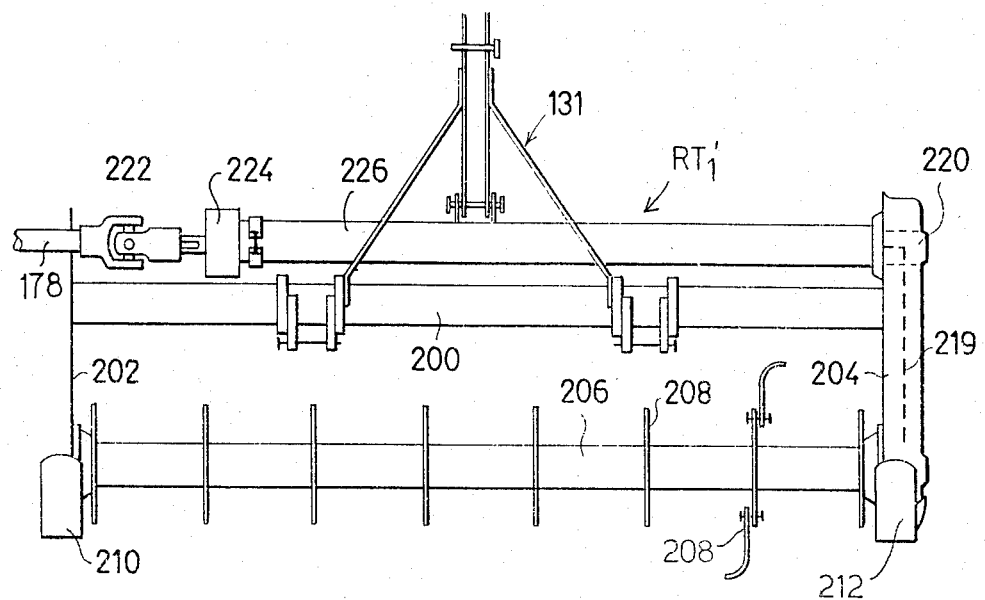
FIG. 4 is a top view illustrating one of the rotary-driven agricultural units, namely a rotary tiller included in the apparatus of FIG. 3.
Figure 5:
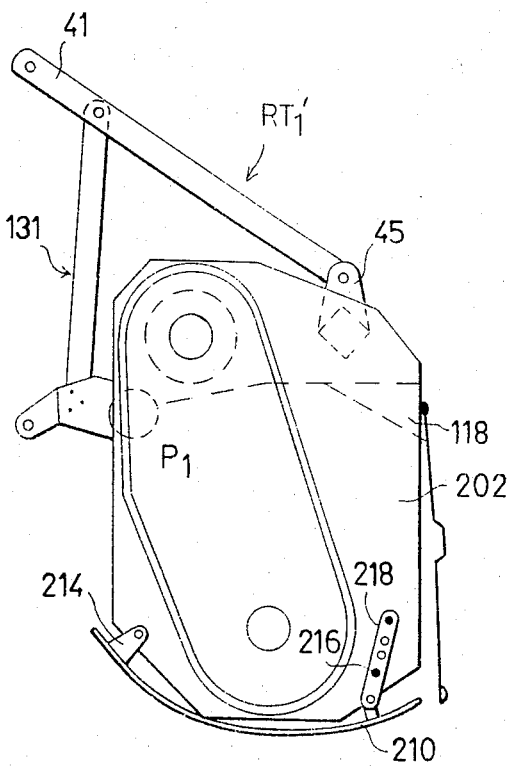
FIG. 5 is a side elevational view illustrating the unit of FIG. 4.

The apparatus illustrated in FIGS. 1 and 2 of the drawings, and also in FIGS. 3-5, is for use to enable three rotary tiller units to be towed at one time by a tractor in order to work a relatively wide strip of the ground during each pass of the tractor. As indicated earlier, however, the apparatus could also be used with but two units, for example in working the field according to an interlacing pattern, or only with one unit if a relatively narrow strip is to be worked during each pass.

The apparatus illustrated in FIGS. 1 and 2 comprises a main frame, generally designated 2, for attachment to the rear end of a towing tractor 'T' with the tractor also supplying the rotary power, for the rotary tiller unit, this power being supplied by the rotary take-off shaft commonly provided in the tractor for driving external equipment. In the example illustrated in FIG. 1, the main frame 2 supports three rotary tiller units $RT_1$, $RT_2$ and $RT_3$. The main frame extends transversely across the rear end of the tractor T, projecting laterally of it on its opposite sides, and is supported by ground-engaging wheels 4 and 6. Two rotary tiller units, $RT_1$ and $RT_2$ are mounted inwardly of the ground-engaging wheels 4, 6 on opposite sides of the main frame 2 along a common axis rearwardly of the main frame. The third rotary tiller unit $RT_3$ is mounted centrally between units $RT_1$ and $RT_2$ and rearwardly of their common axis but in slightly overlapping relationship to them.

The main frame 2 includes two horizontal beams, namely a lower beam 8 and an upper beam 10. The lower beam 8 is of larger cross-sectional area than the upper beam 10 since it carries most of the load applied to the main frame.

The upper horizontal beam 10 is secured to the lower beam 8 by a plurality of short vertical posts 12. In the example illustrated in FIG. 1, there are seven such posts, 12a–12g, there being three of such posts on each side of the center post 12d which latter post is located substantially along the midline of the main frame 2.

As shown particularly in FIG. 2, each of the posts 12b, 12c, 12d being seen in FIG. 2 is formed with a horizontal flange 14 at its upper end, and also with a horizontal flange 16 at its lower end. The upper flanges 14 are secured to the upper horizontal beam 10 by a plurality of U-bolts 18 each enclosing the upper beam 10 and having threaded free ends passing through holes in the flanges and receiving tightening nuts 19. The lower ends of the vertical posts are secured to the lower horizontal beam 8 by straight-shank bolts 20 passing through the lower flanges 16 of the posts, and flanges 21 carried by further posts 22 depending below the lower horizontal beam 8.

The three rotary tiller units $RT_1$, $RT_2$, $RT_3$ are mounted to the horizontal beams 8, 10 by independent 3-point connections, generally designated 31, 32 and 33, respectively. Thus, the 3-point connection 31 for unit $RT_1$ includes an upper link 41 pivotably mounted between the two vertical posts 12a, 12b of the upper horizontal beam 10, and two lower links 42 and 43, each pivotably mounted between a pair of plates 44 secured to and depending below the horizontal beam 8. Rotary tiller unit $RT_2$ at the opposite side of the main frame 2 is independently supported from the main frame 10 by the same type of 3-point connection 32, and extends substantially coaxially to rotary tiller unit $RT_1$, as indicated earlier.

The middle unit $RT_3$ is also independently supported by the 3-point connection 33, but in this case the mounting is not directly to the horizontal beams 8, 10, of the main frame, but rather to a U-shaped beam 50 constituting a subframe mounted to the main frame.

The U-shaped sub-frame 50 thus includes a pair of horizontal legs 51, 52 welded or otherwise fixed to the two vertical posts 12c, 12e on opposite sides of the central post 12d securing the upper horizontal beam 10 to the lower horizontal beam 8. Sub-frame 50 further includes a horizontal leg 53 interconnecting the two end legs 51, 52 which horizontal leg projects rearwardly of the plane of the two horizontal beams 8, 10. Leg 53 includes two further vertical legs 54, 55 also projecting rearwardly of the plane of horizontal beams 8, 10.

The 3-point mounting 33 of the middle rotary tiller unit $RT_3$ includes an upper link 61 pivotably mounted to horizontal leg 53 of the sub-frame 50, and two lower links 62, 63, pivotably mounted to the vertical legs 54, 55 of the sub-frame 50.

The main frame 2 supporting the rotary tiller units $RT_1$–$RT_3$ is adapted to be coupled to the tractor T also by a 3-point connection, namely by the 3-point connection commonly provided in such tractors; and the three rotary tillers are adapted to be driven by the power take-off shaft commonly provided in such tractors. This is more particularly illustrated in FIG. 2 wherein it will be seen that the two short posts 22 depending below the horizontal beam 8 and secured to the horizontal beam by the flanges 21 are each formed at their lower ends with a pair of axially-extending flanges 60, each pair of flanges being straddled by a pin 62 for receiving the two lower links (not shown) of the 3-point connection from the tractor. In addition, the center vertical post 12d joining the upper horizontal beam 10 to the lower horizontal beam 8 is similarly formed with a pair of flanges 64 facing the tractor, which flanges are also joined by a straddling pin 66 for coupling to the upper link of the three-point connection provided on tractors.

It will thus be seen that the complete frame 2 may be raised or lowered with respect to the ground by this 3-point connection to raise or lower all three rotary tillers $RT_1$–$RT_3$ together, each rotary tiller also being mounted on its own three point connection 31, 32, 33, for floating movement independently of the others.

As also shown particularly in FIG. 2, the main frame 2 further includes a power shaft 70 coupleable to the power take-off shaft of the tractor. Power shaft 70 constitutes the input shaft of the main gear box 72 supported centrally of the main frame 2 on a supporting beam 74. Main gear box 72 has three output shafts 75, 76 and 77 (FIG. 1), one for driving each of the three rotary tillers $RT_1$, $RT_2$ and $RT_3$.

Shafts 75 and 76 extend from the opposite sides of the main gear box 72, and are coupled, via Cardan shafts 78 and 79 (FIG. 1), respectively, to bevel gears 80, 81 which are in turn coupled to the gear transmissions 83, 84 of the two end rotary tiller units $RT_1$, $RT_2$. Output shaft 77 from gearbox 72, used for driving the third rotary tiller unit $RT_3$, is coupled via a speed changer 84 to the gear transmission 85 of rotary tiller unit $RT_3$.

In the arrangement illustrated in FIG. 1, all three rotary tiller units $RT_1$–$RT_3$ may be standard, commerciallyavailable units which are provided with their own gear transmission usually a 4-speed transmission which may be preset in the field.

It will thus be seen that in the arrangement illustrated in FIGS. 1 and 2, the main frame can be attached to the tractor T, and to the power take-off shaft of the tractor used for driving the three rotary tiller units $RT_1$–$RT_3$ via the main gear 72. It will also be seen that the apparatus may utilize only two rotary tiller units, namely the side units $RT_1$ and $RT_2$, in which case an interlaced pattern of working the earth would be as described above. A third possibility is to use only one rotary tiller unit, namely the rear unit $RT_3$, if it is desired to work only a relatively narrow strip of the land. It will also be seen that all three rotary tiller units $RT_1$–$RT_3$ may float upwardly or downwardly together via the three-point connection of the main frame 2 to the tractor T; alternatively, each rotary tiller unit may float upwardly or downwardly independently of the other ones by means of its own independent three-point connection 31, 32, 33, respectively.

FIGS. 3–5 illustrate a modification in the apparatus of FIG. 1, primarily to simplify, and thereby to make lighter and less expensive, the drive for the three rotary tiller units, therein designated $RT_1'$, $RT_2'$ and $RT_3'$.

Thus, the main frame illustrated in FIG. 3, therein generally designated 102, also includes the two horizontal beams, therein designated 108, 110, for supporting the two side units $RT_1'$ and $RT_2'$ on the opposite sides of the main frame along a common axis rearwardly of the main frame. Main frame 102 also includes a sub-frame 150 for supporting the third rotary tiller unit $RT_3'$ centrally between, and in slightly overlapping relationship to, the two side units and rearwardly of their common axis. The apparatus of FIG. 3 further includes the main gear box 172 driven by the power take-off shaft from the tractor, which gear box includes three output shafts 175, 176 and 177 for driving the three rotary tiller units $RT_1'$–$RT_3'$, respectively.

In the modification of FIG. 3, however, the two side rotary tiller units $RT_1'$ and $RT_2'$, as well as their coupling to the output shafts 175, 176 of the main gear 172, have been considerably simplified in order to reduce the weight and expense of the overall apparatus. The middle rotary tiller unit $RT_3'$, and its coupling to its output shaft 77 from the main gear box 72, remain the same as in the FIG. 1 arrangement.

The two side rotary units $RT_1'$ and $RT_2'$ and their couplings to the main gear box 172, are substantially the same and can be understood by reference to FIGS. 4 and 5 illustrating unit RT₁' and its coupling to the main gearbox.

Thus, as shown particularly in FIGS. 4 and 5, rotary tiller unit RT₁' includes a frame defined by a longitudinally-extending shaft 200 and a pair of end walls 202, 204; this frame is supported by the three-point connection 131 to the main frame 102, which is the same as connection 31 in the FIGS. 1 and 2 emodiment. End walls 202 and 204 rotatably support a shaft 206 on which the tiller blades 208 are mounted. A pair of skids 210, 212 are secured to the lower ends of the end walls 202, 204, and are engageable with the ground for maintaining the tiller blades 208 spaced from the ground as the tiller unit is towed over it. As shown particularly in FIG. 5, the two skids 210, 212 are each pivotally mounted at the front end of their respective end plates 202, 204 by a pivotal link 214, the rear end of each skid being angularly adjustable by inserting pins 216 projecting from each of the end walls 202, 204, into the appropriate apertures in a plural-apertured link 218 pivotally mounted to the rear end of the skid.

Shaft 206 carrying the tiller blades 208 is rotated by a sprocket chain 219 coupled to one end of shaft 206 adjacent to end wall 204, the sprocket chain being also coupled to a shaft 220 rotated by the Cardan shaft 178 which is coupled to the output shaft 175 (FIG. 3) of the main gearbox 172 via a universal coupling 222. Shaft 220 is rotatably mounted by a rotary bearing 224 and is enclosed within a tubular housing 226.

It will thus be seen that shaft 220 is directly driven by the power take-off shaft of the tractor via the main gearbox 172 and Cardan shaft 178, the rotation of shaft 220 being transmitted, via sprocket chain 219, to rotate shaft 206 and thereby the tiller blades 208 carried by that shaft. This arrangement thus obviates the need for the bevel gear 80 and the tiller gearbox 83 included in the corresponding side unit RT₁ in the FIG. 1 arrangement.

The other side tiller unit RT₂' is similarly constructed as rotary tiller unit RT₁' and is similarly driven directly from the main gearbox 172, thereby also obviating the need for the bevel gear 81 and the tiller gearbox 84, included in the corresponding side unit RT₂ in the FIG. 1 arrangement, The rear rotary tiller unit RT₃', however, is of the same construction as the corresponding unit RT₃ in FIG. 1, and is similarly driven.

It will be seen that the foregoing modifications in the construction and arrangement for driving the two side tiller units RT₁' and RT₂' illustrated in FIGS. 3–5 substantially reduced the weight, and also the expense, of the apparatus illustrated as compared to the arrangement illustrated in FIGS. 1 and 2.

While the invention has been described with respect to two preferred embodiments, it will be appreciated that many other variations, modifications and applications of the invention may be made.

What is claimed is:

1. Agricultural apparatus for attachment to a tractor having a rotary take-off shaft, comprising:
    a main frame attachable at its front end to the rear end of the tractor to extend transversely thereacross;
    a pair of ground-engaging wheels carried on the opposite ends of said main frame for supporting it when towed by the tractor;
    first and second rotary-driven agricultural units spacedly mounted from each other on the opposite sides of the main frame along a common axis rearwardly of the main frame;
    a third rotary-driven agricultural unit mounted on the main frame centrally between and in overlapping relation to said first and second units and rearwardly of their common axis;
    and transmission means coupling said first, second and third agricultural units to the power take-off shaft of the tractor so as to be driven thereby;
    said first, second and third agricultural units each being independently mounted to said main frame by a separate three-point connection permitting independent floating movement thereof with respect to the ground.

2. Apparatus according to claim 1, wherein said main frame includes an intermediate U-shaped sub-frame including a pair of horizontal end legs secured to said main frame and a middle interconnecting leg projecting rearwardly of said main frame, said third agricultural unit being secured to said middle leg of said sub-frame.

3. Apparatus according to claim 1, wherein said main frame comprises an upper horizontal beam and a lower horizontal beam secured in spaced relationship to each other by a plurality of vertical posts.

4. The apparatus according to claim 3, wherein each of said vertical posts is formed with a horizontally-extending flange on its opposite ends and is secured to the two horizontal beams by bolts passing through said flanges.

5. Apparatus according to claim 3, wherein there are at least three of said vertical posts one of which is a central post disposed substantially at the center line of said main frame, said main frame further including two further vertical posts secured to the lower horizontal beam to depend below it on opposite sides thereof, said main frame being attachable to the tractor by a three-point connection cooperable with said vertical center vertical post and said two further vertical posts.

6. Apparatus according to claim 3, wherein said transmission means includes a rotary shaft carried centrally of and below said lower horizontal beam and coupleable to the rotary take-off shaft of the tractor.

7. Apparatus according to claim 1, wherein said transmission means includes a rotary shaft carried centrally of said main frame and coupleable to the rotary take-off shaft of the tractor; a main gear transmission coupled to said rotary shaft; first and second laterally-extending drive shafts coupling said first and second units to said main gear transmission to be driven thereby; and a third drive shaft extending rearwardly of the main frame and coupling said third unit to said main gear transmission to be driven thereby.

8. Apparatus according to claim 1, wherein each of said rotary-driven agricultural units is a rotary tiller including a rotary shaft carrying a plurality of tiller blades.

9. Apparatus according to claim 8, wherein each of said rotary tiller units includes a sprocket chain coupling its rotary shaft to said transmission means.

10. Apparatus according to claim 9, wherein said transmission means comprises: a rotary shaft coupleable to the rotary take-off shaft of the tractor; a main gear transmission coupled to said rotary shaft; first and second laterally-extending drive shafts including a universal joint coupling said main gear transmission to the rotary shaft of the first and second units; and a third rearwardly-extending drive shaft including a universal joint coupling said main gear transmission to the rotary shaft of said third unit.

* * * * *